Jan. 2, 1962 W. T. FOREMAN ETAL 3,015,253

ALKALI METAL ULTRAVIOLET FILTER

Filed July 20, 1959

EXHAUST THEN ADMIT ALKALI METAL ALLOY

INVENTORS
William T. Foreman &
BY Charles H. Shaw
Morse & Altman
ATTORNEYS

3,015,253
ALKALI METAL ULTRAVIOLET FILTER
William T. Foreman, Lexington, Mass., and Charles H. Shaw, Worthington, Ohio, assignors to Baird-Atomic, Inc., Cambridge, Mass., a corporation of Massachusetts
Filed July 20, 1959, Ser. No. 837,311
1 Claim. (Cl. 88—106)

The present invention relates to ultraviolet filters and, more particularly, to high-frequency pass optical filters, which are transparent in the ultraviolet with high rejection ratios in the visible and infrared.

The primary object of the present invention is to provide an optical filter having a predetermined cutoff at an arbitrary wavelength in the ultraviolet between 1550 A. and 3800 A. The filter transmits below this cutoff and becomes opaque above it by virtue of a novel construction characterized by a pair of flat plates that are transparent in the region in which the filter is designed to operate and therebetween a mixture of alkali metals in a uniformly thin layer. This mixture is conveniently disposed within an etched reentrant region in one of the plates and its proportions may be readily predetermined to provide for a selected cutoff.

Other objects of the present invention will in part be obvious and will in part appear hereinafter.

The invention accordingly comprises the product possessing features, properties and the relation of components, and the process involving the several steps and the relation and order of one or more of such steps with respect to each of the other, which are exemplified in the following detailed disclosure, and the scope of which will be indicated in the claim.

For a fuller understanding of the nature and objects of the present invention, reference should be had to the following detailed descriptions taken in connection with the accompanying drawing wherein.

Generally, the product of the present invention is a high pass optical filter which is transparent in the ultraviolet with a high rejection ratio in the visible and the infrared. The filter comprises a thin uniform sheet of suitable alkali metal contained in a region between spaced very flat plates that are transparent in the region of the ultraviolet range for which the filter is designed. One or more of the alkali metals may be employed in accordance with the present invention, particularly, sodium, potassium, lithium, rubidium and cesium. The filter functions by virtue of the high concentration of free electrons in the alkali metals, which electrons approximate a free electron gas. The electrical properties of an ideal electron gas are such that the observed filtering effect occurs as a function of the electron density. The design of the cell is such that a mixture of metals, which may happen to be liquid at room temperature, may be employed as the filter medium. The alkali metals are instantly soluble in one another in both the liquid and solid states. Since the various pure alkali metals are characterized by different volume electron concentrations, any particular electron concentration and hence, any particular optical cutoff may be selected between the extremes dictated by the metals of the mixture.

Figure 1:
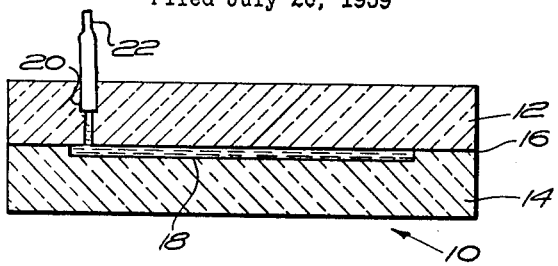
FIG. 1 is a cross-sectional view of a filter constructed in accordance with the present invention.
Figure 2:
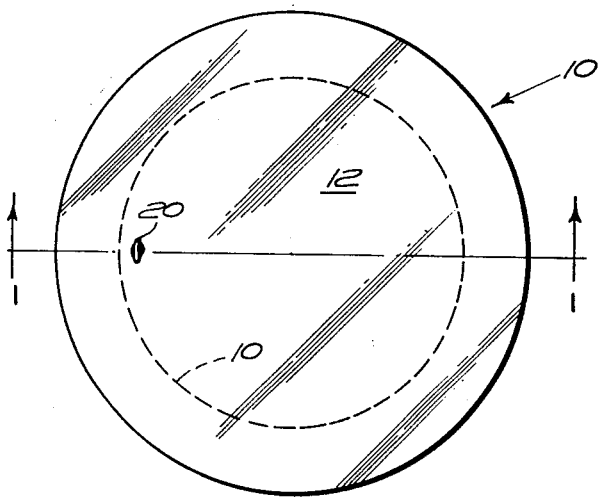
FIG. 2 is a top plan view of the filter of FIG. 1.

As shown in FIGS. 1 and 2, an ultraviolet filter 10 comprises a first disc 12, and a second disc 14, the opposed faces of each of which are optically flat. Discs 12 and 14 are registered and their peripheral edges are sealed together at 16 by any convenient process which will withstand bake-out temperatures of 400 C. The central region of the inner face of disc 14 provides a concavity 18 that, as indicated above, is optically flat and that defines, in conjunction with the inner face of disc 12, a thin chamber. Within this chamber is a mixture of sodium and potassium which may be liquid at room temperature. Disc 12 is provided with a filler tube 20 that is used during fabrication of the filter to exhaust the chamber of air and to inject the alkali metal mixture and that thereafter is sealed off as at 22. The distance between the adjacent inner faces of discs 12 and 14 across the chamber is extremely small, being ordinarily of the order of one micron or less. Preferably discs 12 and 14 are composed of a material such as quartz, which is transparent to ultraviolet light.

The illustrated filter has a cutoff which may be shifted from approximately 3400 A. to approximately 2100 A. merely by varying the composition of the sodium-potassium alloy. Measurements have indicated that the transmission of the filter drops from 0.10 to 0.00001 over a wave length range of approximately 1000 A. if the sodium potassium alloy is approximately 8000 A. thick. For thicker films of the sodium potassium alloy, the rate of transmission drop with increasing wave length is even greater. For best results, the faces of plates 12 and 14 should be flat to within approximately one third the wave length of sodium light.

Figure 3:
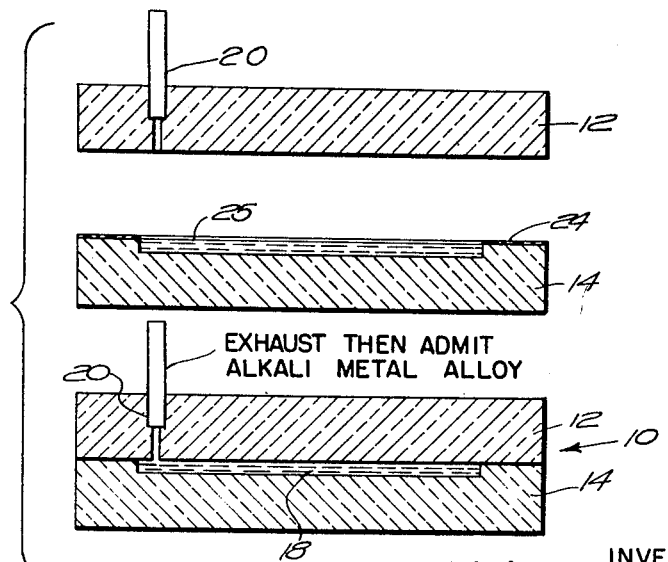
FIG. 3 is a flow diagram, illustrating a process of fabricating the filter of FIG. 1.

As shown in FIG. 3, in the fabrication of the filter of FIGS. 1 and 2 initially disc 12 is provided with a filler tube 20 and disc 14 is provided with a wax annulus 24. Next, a concentrated solution of hydrofluoric acid 25 is placed upon disc 14 and permitted to etch its surface for a predetermined length of time. When the etched surface reaches the appropriate depth the acid and wax 24 are removed and the peripheral regions of discs 14 and 12 are sealed together. Next, the united discs 12 and 14 are baked for a period that is sufficient to ensure removal of all traces of moisture. Then, the liquid alloy is injected into the chamber between the discs. Finally, filler tube 20 is sealed off.

Example

In a specific example of the foregoing process, a cell was fabricated from two discs of fused quartz, each three inches in diameter and one centimeter thick and polished optically flat on both sides to within 0.1 the wavelength of sodium light. One hole was bored in one disc perpendicularly to its faces. The remaining disc was suitably masked with beeswax near the edge of one face and a central two inch diameter section was etched with 5 N hydrofluoric acid for 15 minutes at room temperature. Carefully cleaned peripheral contiguous regions of the two discs were wrung together to provide optical contact, the edge heat sealed and the assembly annealed. The sodium and potassium metals were purified by a three stage vacuum distillation in pyrex. The eutectic alloy was prepared by mixing measured amounts of metals and shaking. To fill the chamber between the discs, the cell, together with a vial of the alloy was sealed to a vacuum system. The cell was baked out at 400° C. under a vacuum of 10–6 mm. Hg while oriented so that the vial was below the chamber. After cooling, the cell-vial system was sealed off from the vacuum system and inverted. The hydrostatic pressure of the liquid alloy was sufficient to cause the alloy to fill the chamber completely. The chamber pressure was brought to atmospheric by admitting argon and the filler tube to the vial was sealed off.

Since certain changes may be made in the above product and process without departing from the scope of the invention herein involved, it is intended that all matter contained in the above description or shown in the accompanying drawing shall be interpreted in an illustrative and not in a limiting sense.

What is claimed is:

A high pass optical filter that is transparent in the ultraviolet with a high rejection ratio is the visible and infrared, said filter comprising a pair of fused quartz slabs each having opposed inner and outer faces, each of said slabs being of the order of one centimeter thick, the inner face of one of said slabs being provided with an outer peripheral rim portion and an inner uniformly etched out portion, said rim portion presenting a face that is optically flat, said etched out portion presenting a face that is optically flat, the inner face of the other of said slabs and the outer faces of said slabs being optically flat, said rim portion being fused to the rim portion of the inner face of said other slab, said etched out portion being spaced in parallelism from the portion of the inner face of said other slab with which it is in registration, the distance between said etched out portion and said inner face of said other slab being at most one micron, said etched out portion and said inner face of said other slab defining therebetween a hermetic chamber, and a mixture of sodium and potassium within said chamber.

References Cited in the file of this patent
UNITED STATES PATENTS

| | | |
|---|---|---|
| 734,454 | Bauermeister | July 21, 1903 |
| 1,013,937 | Hatt | Jan. 9, 1912 |
| 2,833,680 | Kneeling | May 6, 1958 |

OTHER REFERENCES

"A Durable Filter of Alkali Metal," article in "The Review of Scientific Instruments," vol. 6, October 1935, page 328, O'Bryan.